US011786998B2

(12) United States Patent
Peng et al.

(10) Patent No.: US 11,786,998 B2
(45) Date of Patent: Oct. 17, 2023

(54) PIN SHAFT DISMOUNTING AND MOUNTING DEVICE, FRAME BODY CONNECTING STRUCTURE AND WORK MACHINE

(71) Applicant: Beijing Sany Intelligent Manufacturing Technology Co., Ltd., Beijing (CN)

(72) Inventors: Nan Peng, Beijing (CN); Xiaohui Wei, Beijing (CN)

(73) Assignee: Beijing Sany Intelligent Manufacturing Technology Co., Ltd., Beijing (CN)

( * ) Notice: Subject to any disclaimer, the term of this patent is extended or adjusted under 35 U.S.C. 154(b) by 0 days.

(21) Appl. No.: 17/928,588

(22) PCT Filed: Jan. 24, 2022

(86) PCT No.: PCT/CN2022/073482
§ 371 (c)(1),
(2) Date: Nov. 29, 2022

(87) PCT Pub. No.: WO2023/045194
PCT Pub. Date: Mar. 30, 2023

(65) Prior Publication Data
US 2023/0211442 A1    Jul. 6, 2023

(30) Foreign Application Priority Data

Sep. 24, 2021    (CN) ............................ 202111124180.0

(51) Int. Cl.
*B23P 19/027*    (2006.01)
(52) U.S. Cl.
CPC .................................. *B23P 19/027* (2013.01)

(58) Field of Classification Search
CPC .. B23P 19/027; B66C 23/36; Y10T 29/53739; Y10T 29/5383
(Continued)

(56) References Cited

U.S. PATENT DOCUMENTS 3,638,294 A * 2/1972 Durant .................. B25B 27/026
29/252
4,860,539 A * 8/1989 Parrett .................... B66C 23/80
212/277

(Continued)

FOREIGN PATENT DOCUMENTS

CA    2857478 A1 *  1/2015  ................ B60S 9/22
CN    201889623 U    7/2011
(Continued)

OTHER PUBLICATIONS

International Search Report dated Apr. 28, 2022 in application No. PCT/CN2022/073482 filed Jan. 24, 2022.

*Primary Examiner* — Moshe Wilensky
*Assistant Examiner* — Darrell C Ford
(74) *Attorney, Agent, or Firm* — Womble Bond Dickinson (US) LLP

(57) ABSTRACT

The present application provides a pin shaft dismounting and mounting device, a frame body connecting structure and work machine. The pin shaft dismounting and mounting device for dismounting and mounting a pin shaft on a connecting seat, the pin shaft is provided with a through hole along the axial direction, and the device includes: a linear drive mechanism, including telescopic rods; and a pull rod configured to pass through the through hole, a first end of the pull rod being provided with an end cap structure, a connecting structure is disposed between a second end of the pull rod and an end portion of each telescopic rod. By the pin shaft dismounting and mounting device, a frame body connecting structure and work machine, the pin shaft may be (Continued)

dismounted and mounted conveniently and the problems of wear and deformation of the piston rod are solved.

9 Claims, 12 Drawing Sheets

(58) Field of Classification Search
USPC .................................. 29/700, 252, 243.523
See application file for complete search history.

(56) References Cited

U.S. PATENT DOCUMENTS

| | | | |
|---|---|---|---|
| 6,412,157 B1* | 7/2002 | Gray | F16L 55/18 29/272 |
| 9,296,366 B2* | 3/2016 | Ukezeki | B66C 23/78 |
| 2004/0218971 A1* | 11/2004 | Lim | E02F 3/3618 403/322.3 |

FOREIGN PATENT DOCUMENTS

| | | |
|---|---|---|
| CN | 202726418 U | 2/2013 |
| CN | 203045279 U | 7/2013 |
| CN | 203486805 U | 3/2014 |
| CN | 203974398 U | 12/2014 |
| CN | 205802811 U | 12/2016 |
| CN | 209779456 U | 12/2019 |
| CN | 113695871 A | 11/2021 |
| JP | 59123081 U | 8/1984 |
| JP | 2009167002 A | 7/2009 |
| JP | 2010185243 4 | 8/2010 |
| JP | 2015054739 A | 3/2015 |
| WO | 2015184493 A1 | 12/2015 |

* cited by examiner

PIN SHAFT DISMOUNTING AND MOUNTING DEVICE, FRAME BODY CONNECTING STRUCTURE AND WORK MACHINE

CROSS-REFERENCE TO RELATED APPLICATIONS

The present application is a US National Stage Application under 35 USC § 371 of International Application No. PCT/CN2022/073482, filed on Jan. 24, 2022, which claims the priority of Chinese patent application No. 202111124180.0 filed on Sep. 24, 2021, entitled "Pin Shaft Dismounting and Mounting Device, Frame Body Connecting structure and Work machine", which is was incorporated herein by reference in its entirety.

TECHNICAL FIELD

The present application relates to the technical field of work machine, and in particular, to a pin shaft dismounting and mounting device, a frame body connecting structure and work machine.

BACKGROUND

A frame of work machine is generally provided with a pin shaft. For example, a gantry of a rotary drilling rig is connected to the frame through the pin shaft, both the frame and the gantry of the rotary drilling rig are provided with a pair of connecting seats, which is disposed at intervals corresponding to each other. Each connecting seat includes a pair of connecting plates disposed opposite at intervals and each connecting plate on the gantry and the frame is provided with pin shaft holes correspondingly.

When the gantry and the frame are connected together, the connecting plates on the gantry and the frame are first staggered, pin shaft holes on the gantry and the frame are aligned and the pin shaft is mounted into a corresponding pin shaft hole.

In order to facilitate the disassembly and assembly of the pin shaft in the related art, a piston rod of a cylinder is used as the pin shaft. The piston rod of the cylinder may be controlled to be stretched and mounted into the corresponding pin shaft hole when being mounted while the piston rod of the cylinder may be controlled to be retracted and withdrawn from the pin shaft hole when being dismounted.

However, the piston rod may be worn or deformed after being used for a long time.

Therefore, how to conveniently disassemble and assemble the pin shaft, and solve the problems of wear and deformation of the piston rod has become an important problem to be solved.

SUMMARY

In view of the problems above, the present application provides a pin shaft dismounting and mounting device, a frame body connecting structure and work machine, which can conveniently disassemble and assemble a pin shaft and solve the problems of wear and deformation of a piston rod.

An embodiment of the present application provides a pin shaft dismounting and mounting device for dismounting and mounting a pin shaft on a connecting seat, the pin shaft is provided with a through hole along the axial direction, and the device includes:
a linear drive mechanism, including telescopic rods; and
a pull rod configured to pass through the through hole, a first end of the pull rod being provided with an end cap structure, a connecting structure being disposed between a second end of the pull rod and an end portion of each telescopic rod.

According to the pin shaft dismounting and mounting device of the present application, the number of the telescopic rods is two or more and the telescopic rods are extendable from both ends of the linear drive mechanism.

According to the pin shaft dismounting and mounting device of the present application, the linear drive mechanism may be a double-ended oil cylinder.

According to the pin shaft dismounting and mounting device of the present application, the linear drive mechanism includes:
a bracket;
a first oil cylinder disposed on the bracket; and
a second oil cylinder disposed on the bracket and arranged side by side with the first oil cylinder, telescopic rods of the second oil cylinder and the first oil cylinder are arranged in an opposite direction.

According to the pin shaft dismounting and mounting device of the present application, the bracket includes a first clamping body and a second clamping body, barrels of the first oil cylinder and the second oil cylinder are fixedly disposed between the first clamping body and the second clamping body, and the telescopic rods of the second oil cylinder and the first oil cylinder are capable of passing through the bracket and extending from the barrel respectively.

According to the pin shaft dismounting and mounting device of the present application, the device further includes a reversing valve configured to control the extending direction of the telescopic rod.

According to the pin shaft dismounting and mounting device of the present application, the connecting structure includes:
an external thread disposed on the second end of the pull rod; and
a threaded hole disposed on an end surface of the telescopic rod, the external thread is fitted with the threaded hole.

An embodiment of the present application provides a frame body connecting structure, including:
a first frame body,
a second frame body, each of the first frame body and the second frame body is provided with a connecting seat, each connecting seat is provided with a pin shaft hole, and the second frame body is connected to the first frame body through a pin shaft, the pin shaft is provided with a through hole, and
a pin shaft dismounting and mounting device, connected to the first frame body or the second frame body, the pin shaft dismounting and mounting device is the pin shaft dismounting and mounting device as described above, and the telescopic rod corresponds to the pin shaft.

In the frame body connecting structure according to the present application, the connecting seat includes a first connecting seat and a second connecting seat disposed at intervals, and the bracket is disposed slidably between the first connecting seat and the second connecting seat, and the bracket is switchable between a first position in which the telescopic rod of the first oil cylinder corresponds to the pin shaft hole of the first connecting seat and a second position in which the telescopic rod of the second oil cylinder corresponds to the pin shaft hole of the second connecting seat.

An embodiment of the present application provides work machine, including the above-mentioned frame body connecting structure.

The pin shaft dismounting and mounting device for dismounting and mounting a pin shaft on a connecting seat, each connecting seat is provided with a pin shaft hole and the pin shaft is provided with a through hole along the axial direction.

The pin shaft dismounting and mounting device includes a linear drive mechanism and a pull rod, the linear drive mechanism can be disposed on one side of the connecting seat and includes a telescopic rod, and the telescopic rod corresponds to the pin shaft hole.

The first end of the pull rod is provided with an end cap structure, the radial length of the end cap structure is greater than the inner diameter of the through hole, and a connecting structure is disposed between a second end of the pull rod and an end portion of each telescopic rod.

When the pin shaft is mounted by using the pin shaft dismounting and mounting device according to the present application, the pin shaft and the linear drive mechanism are located on opposite sides of the pin shaft hole respectively. The pin shaft is firstly aligned with the pin shaft hole, and the second end of the pull rod passes into the through hole of the pin shaft and is connected to the telescopic rod of the linear drive mechanism through the connecting structure after passing through the through hole. The first end of the pull rod is stuck outside the through hole since the first end of the pull rod is provided with an end cap structure, and the radial length of the end cap structure is greater than the inner diameter of the through hole. The telescopic rod of the linear drive mechanism is controlled to be retracted, and the pin shaft is ejected into the pin shaft hole through the telescopic rod and thus the mounting of the pin shaft is completed. When the pin shaft needs to be dismounted, and the pin shaft may be pushed out from the pin shaft hole by controlling the telescopic rod of the linear drive mechanism to stretch out. By the pin shaft dismounting and mounting device of the present application, the pin shaft may be dismounted and mounted conveniently and the problems of wear and deformation of the piston rod are solved.

In a further embodiment, the number of the telescopic rods is two or more and the telescopic rods are extendable from both ends of the linear drive mechanism. The connecting seat for mounting the pin shaft includes a first connecting seat and a second connecting seat, the first connecting seat and the second connecting seat are disposed at intervals, and the linear driving mechanism is disposed between the first connecting seat and the second connecting seat. The linear drive mechanism includes two or more telescopic rods, and the two or more telescopic rods correspond to the pin shaft holes of the first connecting seat and the second connecting seat respectively. The linear drive mechanism is disposed between the first connecting seat and the second connecting seat, and the telescopic rods of the linear drive mechanism are capable of driving the pin shafts on the first connecting seat and the second connecting seat respectively to disassemble and assemble the pin shafts.

The linear drive mechanism is disposed between the first connecting seat and the second connecting seat, which may increase the compactness of the device, reduce the overall volume of the device, and avoid the interference of the linear drive mechanism with the external device. The disassembly and assembly of the two pin shafts can be controlled simultaneously through a linear drive mechanism, which improves the utilization rate of the device.

In a further embodiment, the linear drive mechanism includes a bracket, a first oil cylinder and a second oil cylinder. During mounting, the bracket is disposed slidably between the first connecting seat and the second connecting seat, and is switchable between the first position and a second position. The first oil cylinder is disposed on the bracket and the telescopic rod of the first oil cylinder corresponds to the pin shaft hole of the first connecting seat when the bracket is in the first position while the second oil cylinder is disposed on the bracket side by side with the first oil cylinder and the telescopic rod of the second oil cylinder corresponds to the pin shaft hole of the second connecting seat when the bracket is in the second position.

Since the first oil cylinder and the second oil cylinder are disposed side by side on the bracket, when the pin shaft corresponding to the first oil cylinder needs to be dismounted and mounted, the bracket can be controlled to slide, and the first oil cylinder correspond to the pin shaft hole of the first connecting seat. After the disassembly and assembly of the pin shaft are completed through the first oil cylinder, the bracket is controlled to slide to the second position, the second oil cylinder corresponds to the pin shaft hole of the second connecting seat, and the pin shaft on the second connecting seat is dismounted and mounted through the second oil cylinder. In the pin shaft dismounting and mounting device according to the present application, the overall length formed by the first oil cylinder and the second oil cylinder is short, which can be adapted to the case where the distance between the first connecting seat and the second connecting seat is small.

The present application further provides a frame body connecting structure and work machine. The frame body connecting structure includes a first frame body, a second frame body, and the above-mentioned pin shaft dismounting and mounting device. Each of the first frame body and the second frame body is provided with a connecting seat, each connecting seat is provided with a pin shaft, the second frame body is connected with the first frame body through a pin shaft, and the pin shaft is provided with a through hole; the pin shaft dismounting and mounting device is connected with the first frame body or the second frame body and the telescopic rod corresponds to the pin shaft. The work machine according to the present application includes the above-mentioned frame body connecting structure.

By the frame body connecting structure and the work machine according to the present application, the pin shaft may be dismounted and mounted conveniently and the problems of wear and deformation of the piston rod are solved. The beneficial effects of the frame body connecting structure and the work machine is generally similar to those of the above-mentioned pin shaft dismounting and mounting device, and will not be repeated here.

BRIEF DESCRIPTION OF THE DRAWINGS

In order to more clearly illustrate the embodiments of the present application or related art, the drawings used in the descriptions of the embodiments or the related art will be briefly described below. The drawings in the following description are only certain embodiments of the present application, and other drawings may be obtained according to the drawings without any creative work for those skilled in the art.

Figure 1:
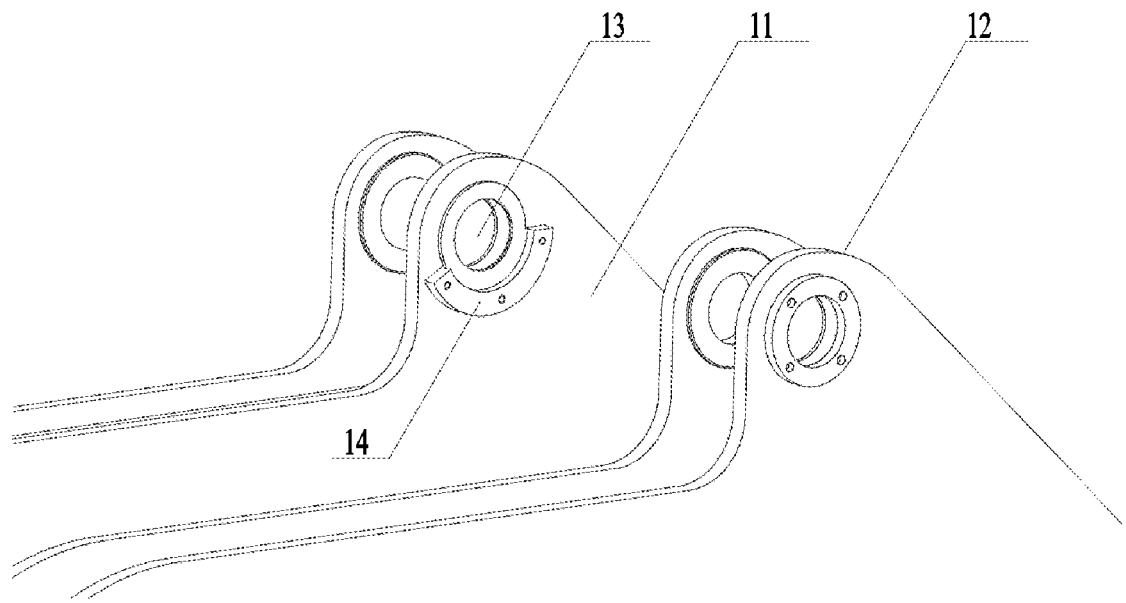
FIG. 1 is a schematic structural diagram of a main body of a vehicle frame according to an embodiment of the present application.
Figure 2:
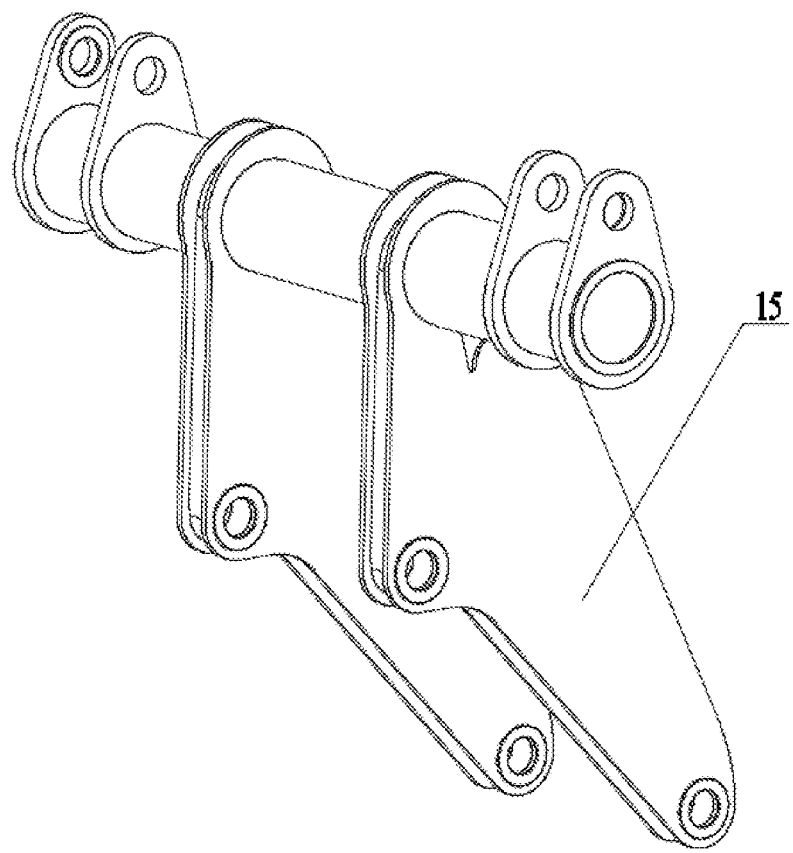
FIG. 2 is a schematic structural diagram showing a gantry according to an embodiment of the present application.
Figure 3:
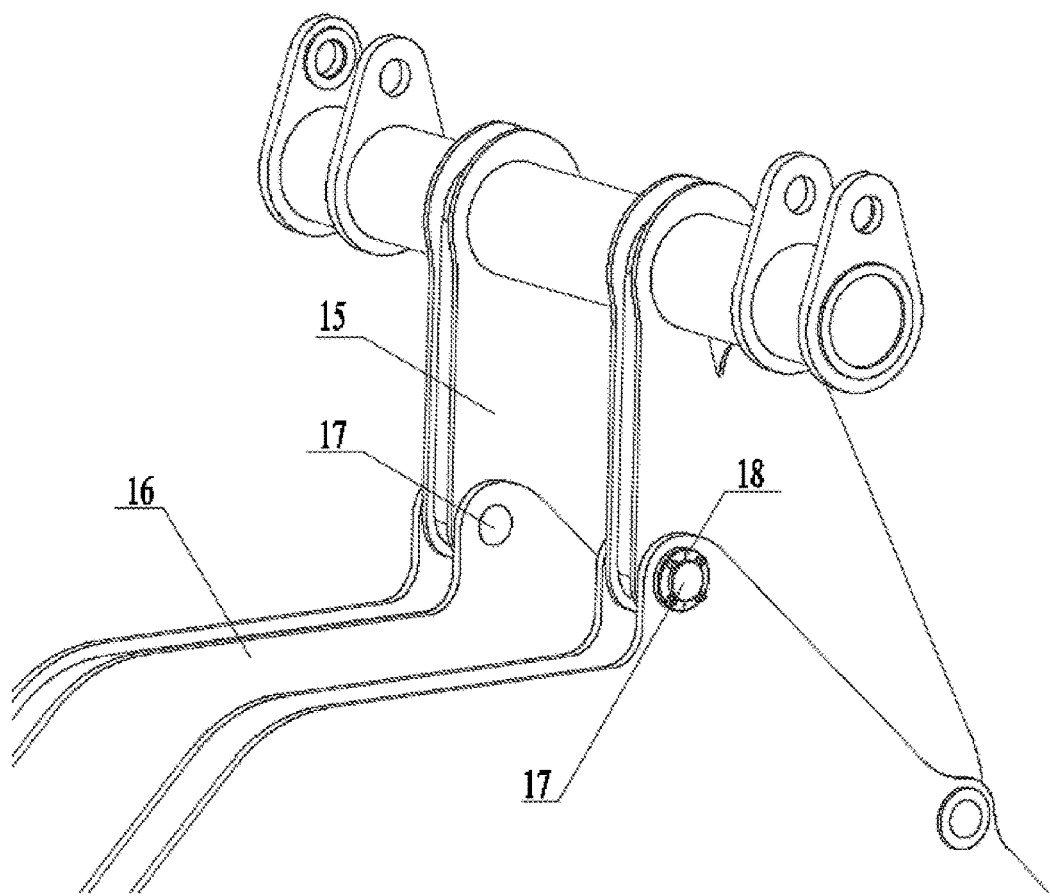
FIG. 3 is a schematic diagram of a connecting structure between a frame body and a gantry according to an embodiment of the present application.
Figure 4:
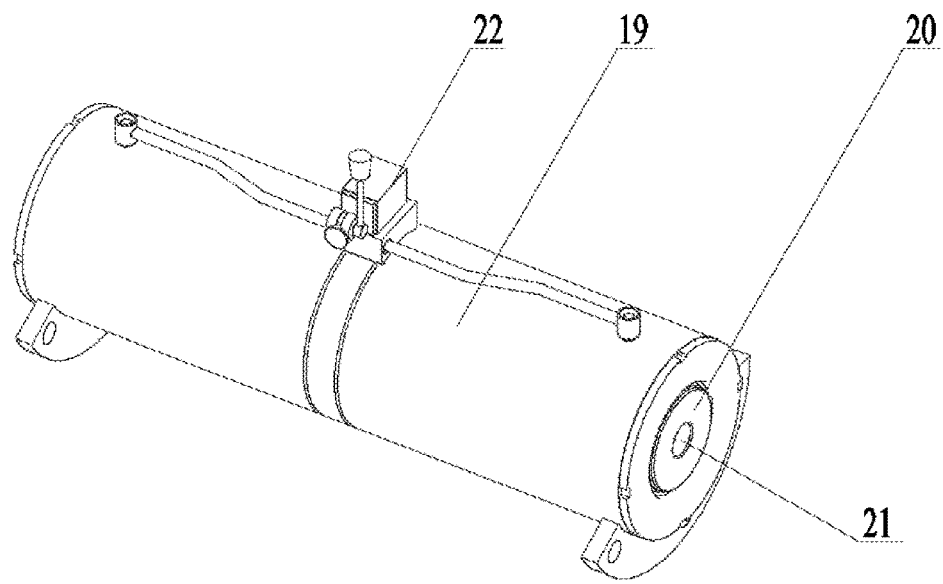
FIG. 4 is a schematic diagram of a double-ended oil cylinder in a retracted state according to an embodiment of the present application.
Figure 5:
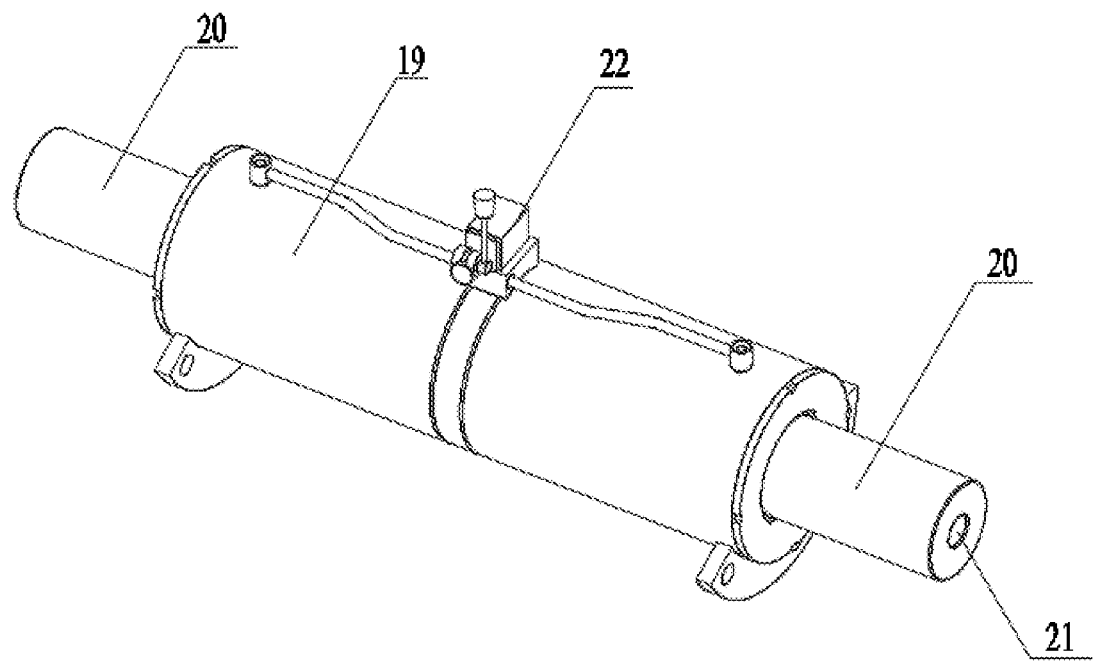
FIG. 5 is a schematic diagram of a double-ended oil cylinder in a stretched state according to an embodiment of the present application.
Figure 6:
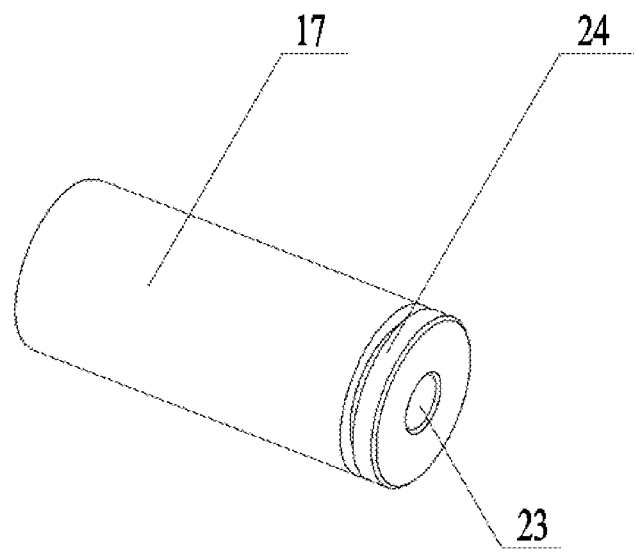
FIG. 6 is a schematic structural diagram of a pin shaft according to an embodiment of the present application.
Figure 7:
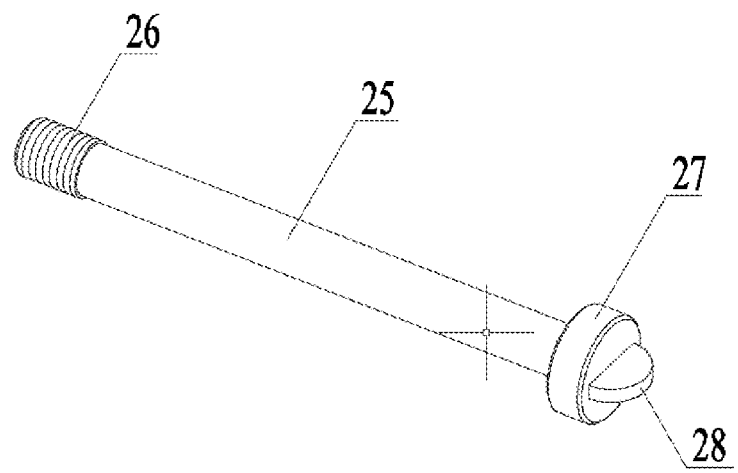
FIG. 7 is a schematic structural diagram of a pull rod according to an embodiment of the present application.

| Reference number: |
| --- |
| 11: first connecting seat; |
| 12: second connecting seat; |
| 13: pin shaft hole; |
| 14: oil cylinder bracket; |
| 15: gantry; |
| 16: frame body; |

| Reference number: |
| --- |
| 17: pin shaft; |
| 18: connecting assembly; |
| 19: double-ended oil cylinder; |
| 20: telescopic rod; |
| 21: threaded hole; |
| 22: reversing valve; |
| 23: through hole; |
| 24: annular groove; |
| 25: pull rod; |
| 26: external thread; |
| 27: end cap structure; |
| 28: head-screwing structure; |
| 29: first oil cylinder; |
| 30: second oil cylinder; |
| 31: first clamping body; |
| 32: second clamping body; |
| 33: guide post; |
| 34: chute; |
| 35: guide groove. |

DETAILED DESCRIPTION

In order to more clearly illustrate the purposes, solutions and advantages of the present application, embodiments of the present application will be described clearly and completely below with reference to the drawings in the embodiments of the present application. The described embodiment is a part of the embodiments of the present application, rather than all of the embodiments. All other embodiments obtained by those of ordinary skill in the art based on the embodiments of the present application without creative efforts shall fall within the protection scope of the present application.

A pin shaft dismounting and mounting device, a frame body connecting structure and work machine according to the embodiments of the present application are described below with reference to FIGS. 1 to 17.

The pin shaft dismounting and mounting device according to the present embodiment includes a linear drive mechanism and a pull rod 25. The pin shaft dismounting and mounting device according to the present embodiment is configured for dismounting and mounting the pin shaft 17 on the connecting seat.

Each connecting seat is provided with a pin shaft hole 13. Specifically, the connecting seat may be a connecting seat on the frame body 16. For example, in a rotary drilling rig in the related art, the frame body 16 is provided with a connecting seat. The gantry 15 of the rotary drilling rig is connected to the connecting seat on the frame body 16 through the pin shaft 17. In other embodiments, the connecting seat can also be a pin connecting seat of other devices, for example, a pin connecting seat on a hoisting machine.

The pin shaft 17 is mounted inside the pin shaft hole 13 of the connecting seat. The pin shaft 17 is provided with a through hole 23 along its axial direction. The through hole 23 may be a central hole of the pin shaft 17, specifically a circular hole.

The linear drive mechanism is disposed on one side of the connecting seat. The linear drive mechanism includes a telescopic rod 20 corresponding to the pin shaft hole 13, and having a diameter smaller than a diameter of the pin shaft hole 13 and larger than a diameter of the through hole 23. The linear drive mechanism may be an oil cylinder, an air cylinder, a linear motor, etc., and the telescopic rod 20 of the linear drive mechanism can perform telescopic movement along its axial direction. The diameter of the telescopic rod 20 is smaller than the diameter of the pin shaft hole 13, and thus the telescopic rod 20 can perform telescopic movement in the pin shaft hole 13, while the diameter of the telescopic rod 20 is larger than the diameter of the through hole 23, and thus the telescopic rod 20 can abut against the end portion of the pin shaft 17 to drive the pin shafts 17 to move.

The outer diameter of the pull rod 25 is smaller than the inner diameter of the through hole 23 and the pull rod 25 can stretch into or out of the through hole 23. A first end of the pull rod 25 is provided with an end cap structure 27 having a radial length greater than the inner diameter of the through hole 23 and a connecting structure is disposed between the second end of the pull rod 25 and the end portion of each telescopic rod 20. The length of the main body of the pull rod 25 needs to be greater than the length of the pin shaft 17 and the second end of the pull rod 25 can stretch from an end where the through hole 23 of the pin shaft 17 is located and stretch out from another end of the pin shaft 17.

When the pin shaft 17 is mounted by using the pin shaft dismounting and mounting device according to the present application, the pin shaft 17 and the linear drive mechanism are located on opposite sides of the pin shaft hole 13 respectively. The pin shaft is 17 firstly aligned with the pin shaft hole 13, and the second end of the pull rod 25 passes into the through hole 23 of the pin shaft 17 and is connected to the telescopic rod 20 of the linear drive mechanism through the connecting structure after passing through the through hole 23. The first end of the pull rod 25 is stuck outside the through hole 23 since the first end of the pull rod 25 is provided with an end cap structure 27, and the radial length of the end cap structure 27 is greater than the inner diameter of the through hole 23. The telescopic rod 20 of the linear drive mechanism is controlled to be retracted, and the pin shaft 17 is pulled into the pin shaft hole 13 through the telescopic rod 20 and thus the mounting of the pin shaft 17 is completed. When the pin shaft 17 needs to be dismounted, and the pin shaft 17 may be pushed out from the pin shaft hole 13 by controlling the telescopic rod 20 of the linear drive mechanism to stretch out.

By the pin shaft dismounting and mounting device of the present application, the pin shaft 17 may be dismounted and mounted conveniently and the problems of wear and deformation of the piston rod caused by directly adopting the piston rod as the pin shaft 17 are solved.

In a further embodiment, the connecting seat includes a first connecting seat 11 and a second connecting seat 12, the first connecting seat 11 may include a pair of lugs disposed at intervals and provided with corresponding pin shaft holes 13. Similarly, the second connecting seat 12 may include a pair of lugs disposed at intervals and provided with corresponding pin shaft holes 13. In other embodiments, the first connecting seat 11 and the second connecting seat 12 may also have other structures.

The first connecting seat 11 and the second connecting seat 12 are disposed at intervals, and the linear driving mechanism is disposed between the first connecting seat 11 and the second connecting seat 12. A mounting seat for mounting the linear drive mechanism may be disposed on a corresponding surface of the first connecting seat 11 or the second connecting seat 12 and the linear drive mechanism may be connected to the mounting seat through bolts.

The linear drive mechanism includes a pair of telescopic rods 20, and the pair of telescopic rods 20 correspond to the pin shaft holes 13 of the first connecting seat 11 and the second connecting seat 12 respectively.

In this case, the telescopic rod 20 corresponding to the first connecting seat 11 of the linear drive mechanism is configured to disassemble and assemble the pin shaft 17 of the first connecting seat 11, and the telescopic rod 20 corresponding to the second connecting seat 12 of the linear driving mechanism is configured to disassemble and assemble the pin shaft 17 of the second connecting seat 12.

In a further embodiment, the linear drive mechanism disposed between the first connecting seat 11 and the second connecting seat 12 is configured as a double-ended oil cylinder 19. Two telescopic rods 20 of the double-ended oil cylinder 19 are driven by a hydraulic system to perform telescopic movement, and the disassembly and assembly of the pin shafts 17 at both ends of the double-ended oil cylinder 19 is completed.

The extending or retraction of the telescopic rods 20 of the double-ended oil cylinder 19 is driven by hydraulic pressure and controlled by a reversing valve 22. The double-ended oil cylinder 19 may be single-stage or multi-stage. In other embodiments, the double-ended oil cylinder 19 can also be replaced with an air cylinder or a linear motor according to different application occasions. When the linear motor is used, a switch is used for control.

In some embodiments, a manual reversing valve may be used to uniformly control the extending or retraction of the two telescopic rods 20 of the double-ended oil cylinder 19. the two telescopic rods 20 may be non-synchronous due to uneven resistance and the two telescopic rods 20 can be fully stretched or fully retracted finally. Two reversing valves 22 may be used to individually control the two telescopic rods 20 if the independent movement of the two telescopic rods 20 is required.

In order to conveniently connect the double-ended oil cylinder 19, an oil cylinder bracket 14 may be disposed on corresponding surfaces of the first connecting seat 11 and the second connecting seat 12, a bolt hole is disposed on the oil cylinder bracket 14, and both ends of a barrel of the double-ended oil cylinder 19 are respectively connected to the oil cylinder bracket 14 by bolts.

Detail description will be made below by taking the double-ended oil cylinder 19, the frame body 16 and the gantry 15 disposed on the frame body 16 as examples.

The dismounting of pin shaft 17 for connecting the gantry 15 to the frame body 16 is described as follows.

Figure 8:
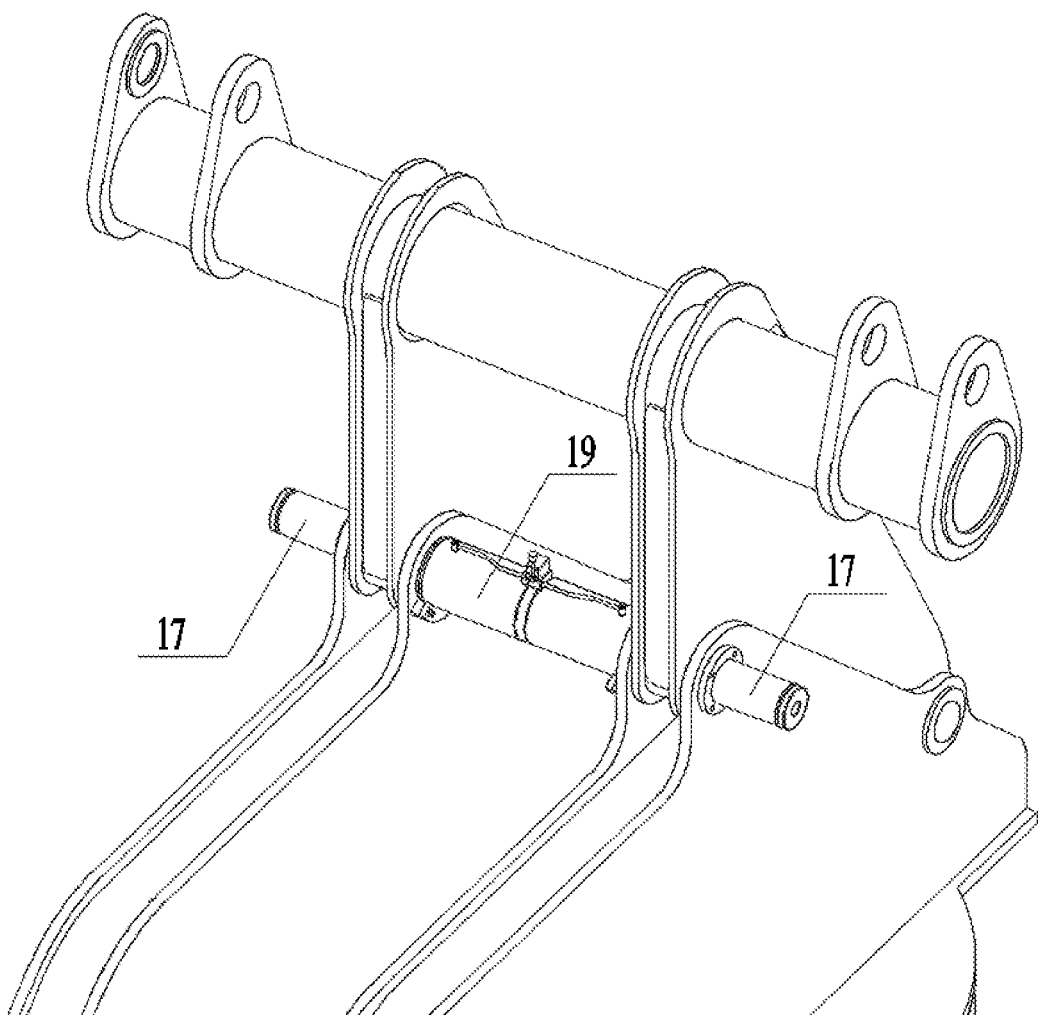
FIG. 8 is a schematic diagram of a first state in which a gantry is dismounted from a frame body by using a double-ended oil cylinder according to an embodiment of the present application.

In a first step, referring to FIG. 8, after the connecting assembly 18 between the end portion of the pin shaft 17 and the connecting seat is removed, the double-ended oil cylinder 19 is operated to stretch the two telescopic rods 20, and the pin shaft 17 is then ejected by the telescopic rod 20, the pin shaft 17 remains in the pin shaft hole 13 of an outer lug plate of the frame body 16 (the pin shaft 17 is in a disengaged state). In this case, the telescopic rod 20 remains inside the pin shaft hole 13 and the surface of the telescopic rod 20 will not be worn by the pin shaft hole 13 since the outer diameter of the telescopic rod 20 is smaller than the inner diameter of the pin shaft hole 13.

Figure 9:
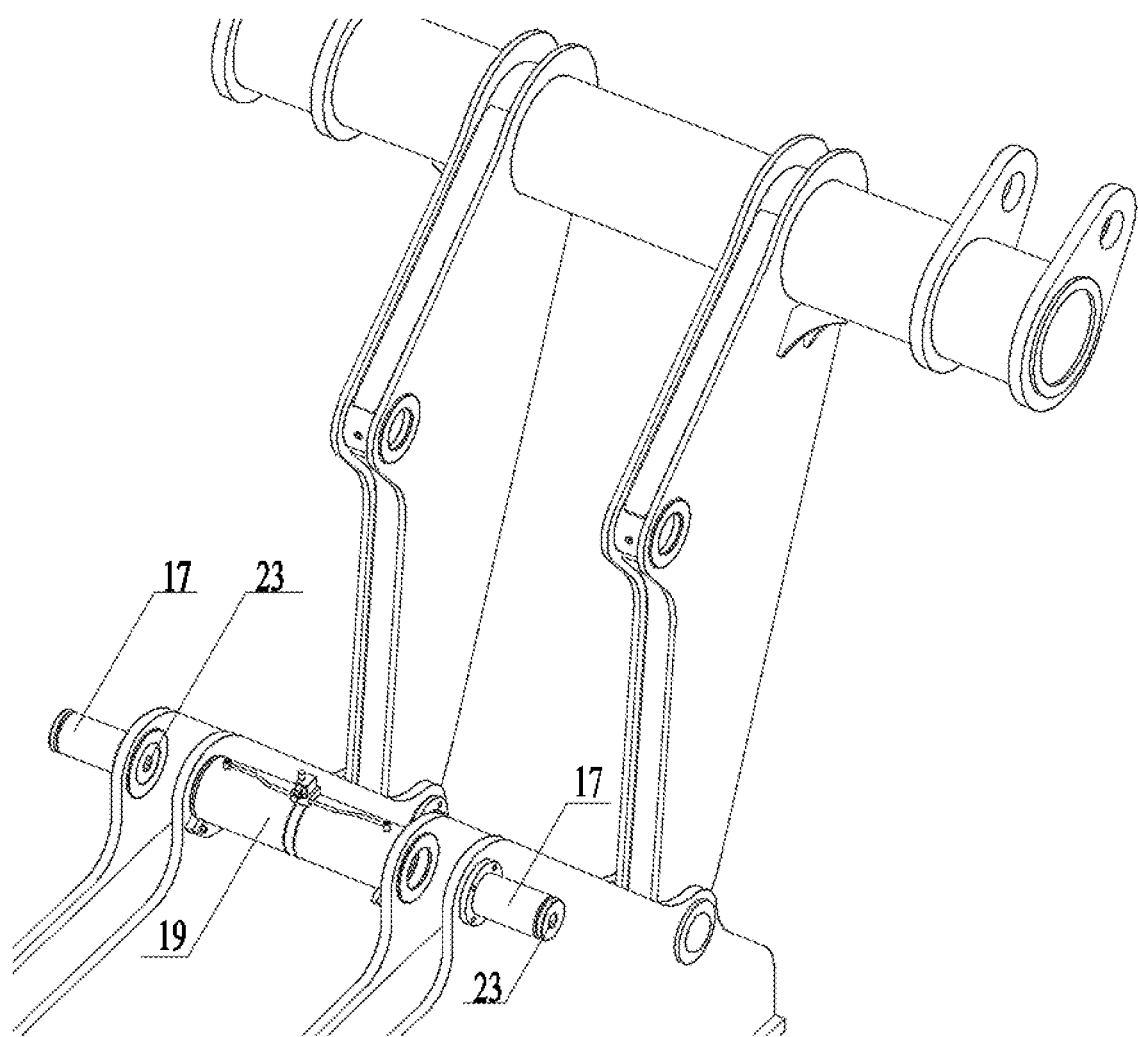
FIG. 9 is a schematic diagram of a second state in which a gantry is dismounted from a frame body by using a double-ended oil cylinder according to an embodiment of the present application.

In a second step, referring to FIG. 9, the double-ended oil cylinder 19 is operated to retract the two telescopic rods 20 and the pin shaft 17 remains in the pin shaft hole 13 of an outer lug plate of the frame body 16. The gantry 15 and the frame body 16 can be separated by an external force since the connection between them has been released.

The mounting process of pin shaft 17 for connecting the gantry 15 to the frame body 16 is described as follows.

Figure 10:
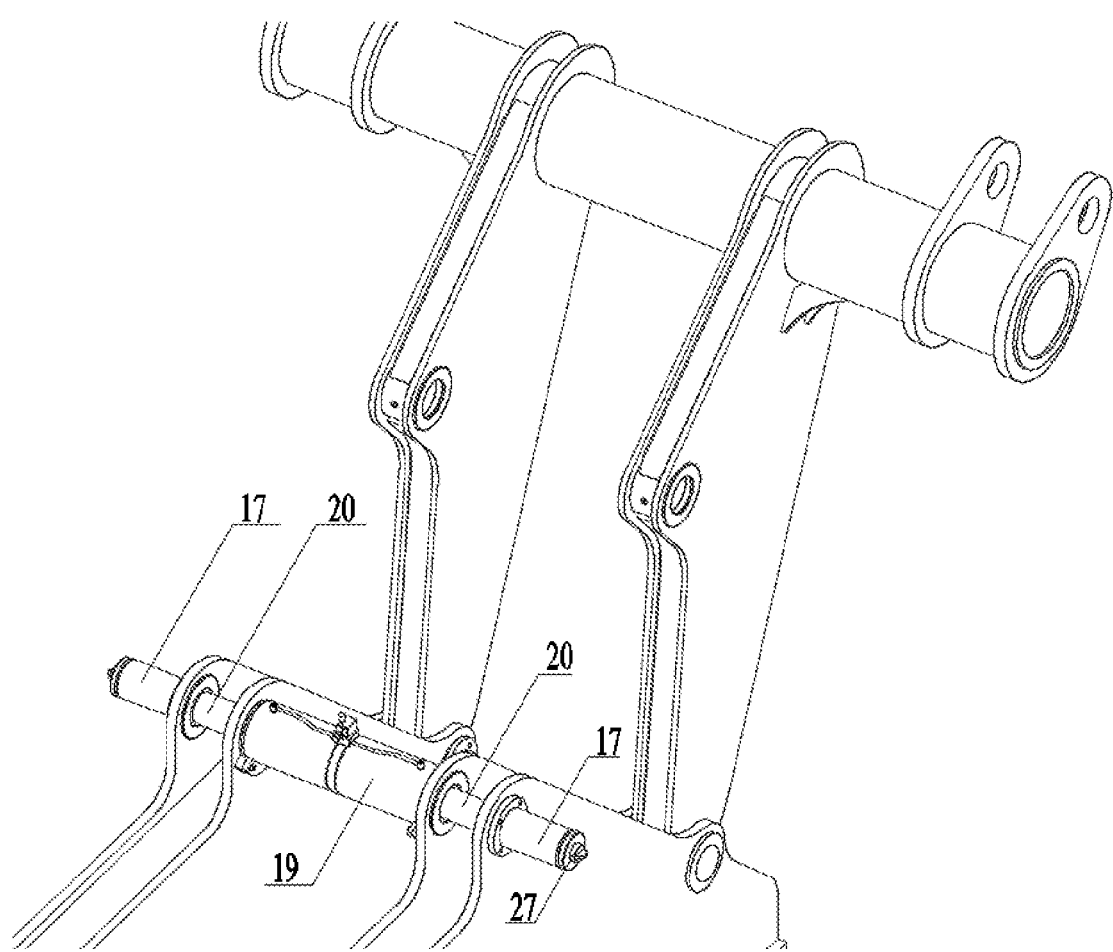
FIG. 10 is a schematic diagram of a first state in which a gantry is connected to frame body by using a double-ended oil cylinder according to an embodiment of the present application.

In a first step, referring to FIG. 10, the double-ended oil cylinder 19 is operated to stretch the two telescopic rods 20 again until two telescopic rods 20 come into contact with an inner end surface of the pin shaft 17 in the above-mentioned disengaged state. The pull rod 25 is inserted into the through hole 23 of the pin shaft 17 from the outside, and is connected to the telescopic rod 20 of the double-ended oil cylinder 19.

Figure 11:
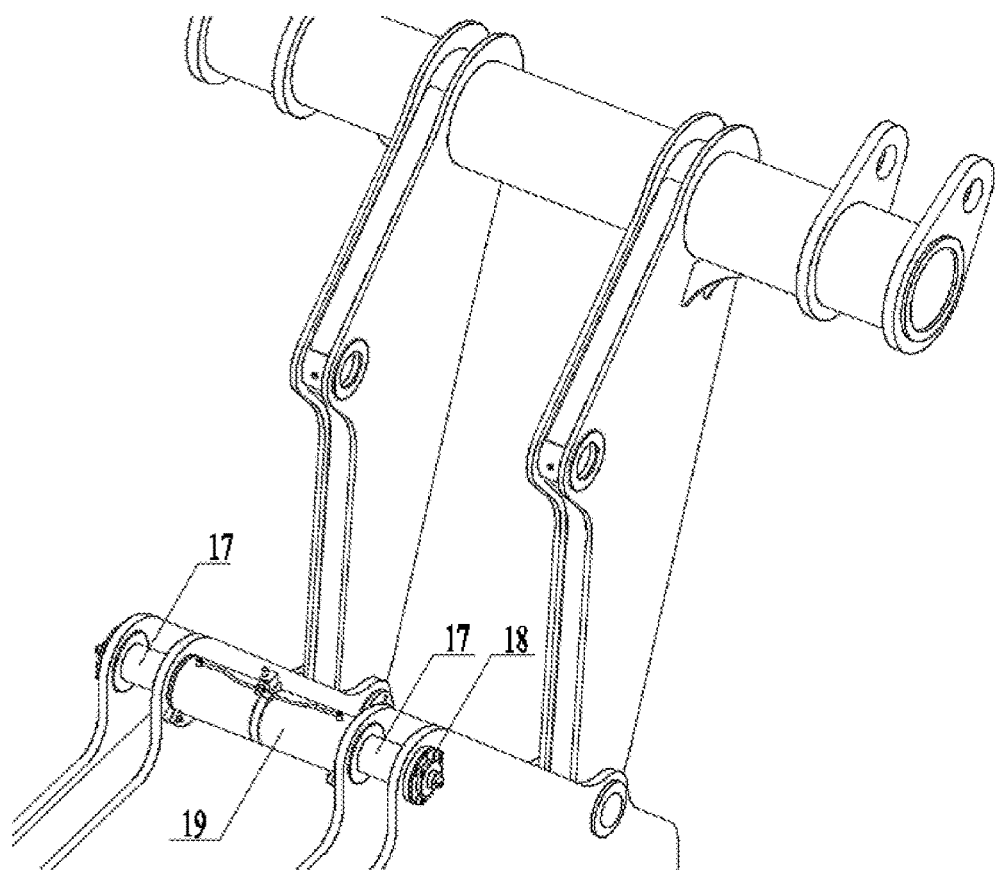
FIG. 11 is a schematic diagram of a second state in which a gantry is connected to frame body by using a double-ended oil cylinder according to an embodiment of the present application.
Figure 12:
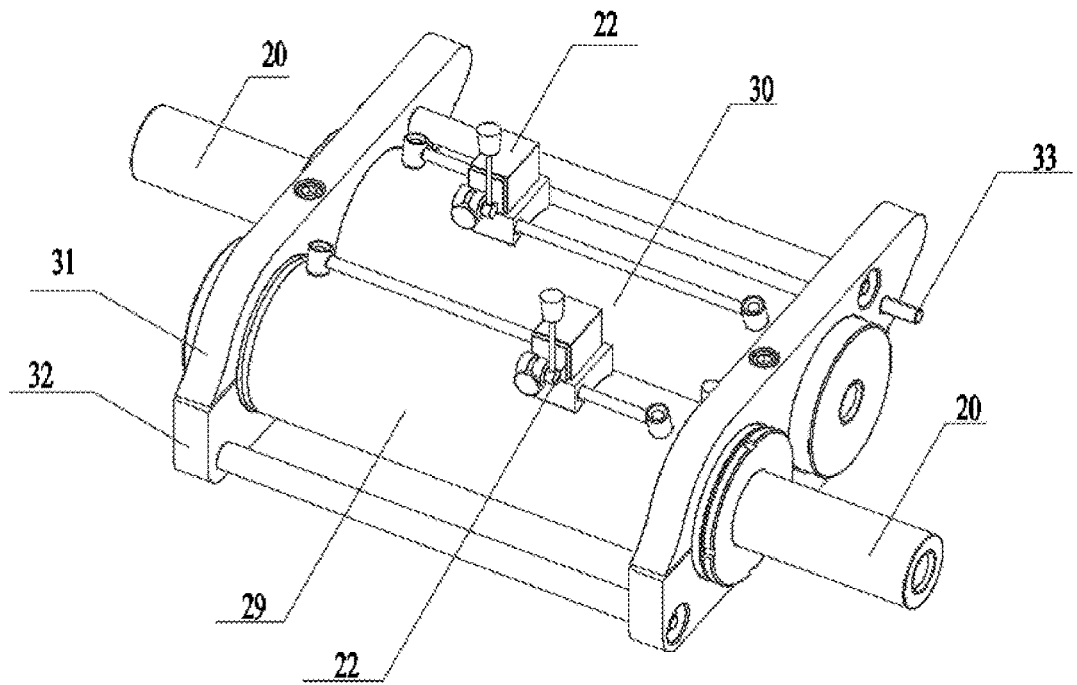
FIG. 12 is a schematic structural diagram of a connecting structure of a bracket, a first oil cylinder and a second oil cylinder according to an embodiment of the present application.
Figure 13:
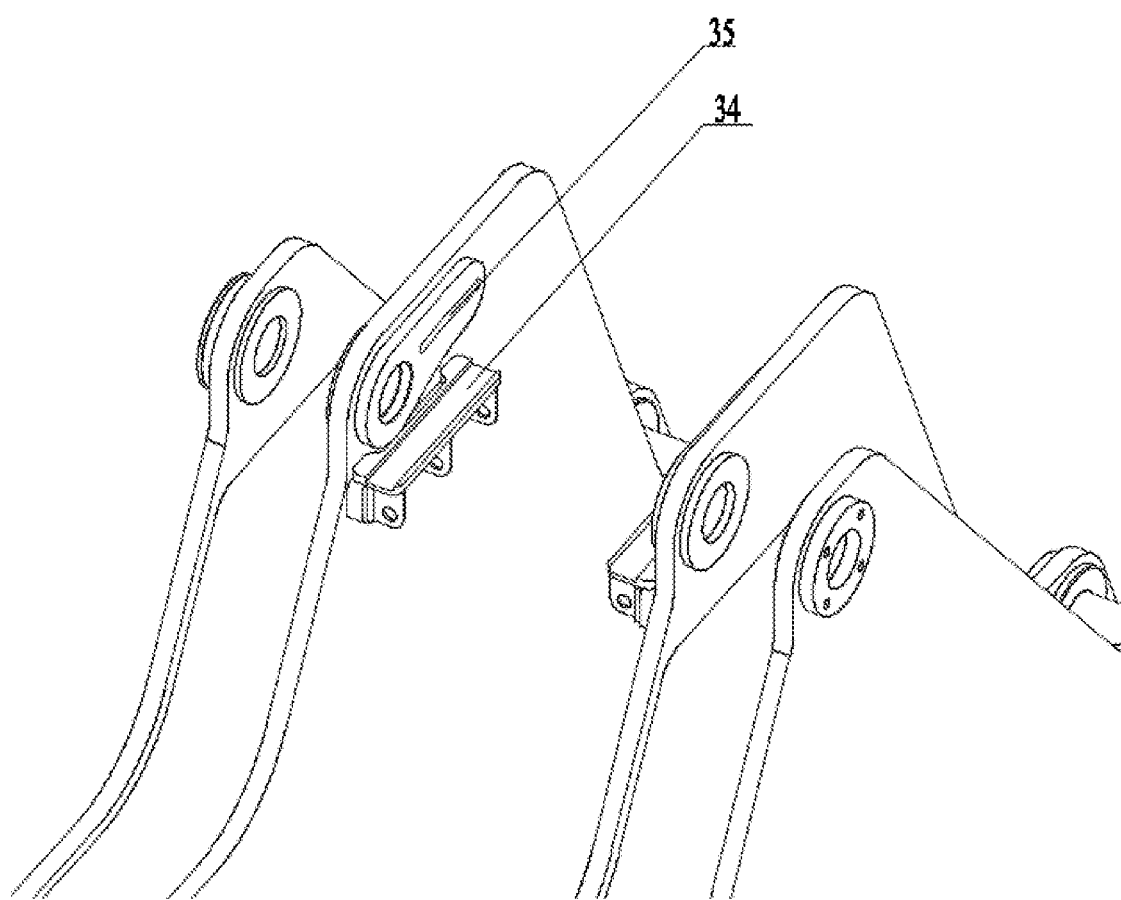
FIG. 13 is a schematic structural diagram of a seat body for mounting a bracket on a frame body according to an embodiment of the present application.

In a second step, referring to FIG. 11, the double-ended oil cylinder 19 is operated to retract the telescopic rods 20, the pin shaft 17 is pulled into a hole under the action of the pull rod 25, and then the end portion of the pin shaft 17 is connected to the connecting seats through the connecting assembly 18.

In a further embodiment, the linear drive mechanism includes a bracket, a first oil cylinder 29 and a second oil cylinder 30.

The bracket is slidably disposed between the first connecting seat 11 and the second connecting seat 12, and the bracket is switchable between a first position and a second position. Specifically, the bracket includes a first clamping body 31 and a second clamping body 32, the first clamping body 31 and the second clamping body 32 may have plate-like structures, and the barrels of the first oil cylinder 29 and the second oil cylinder 30 are sandwiched between the first clamping body 31 and the second clamping body 32, and the first clamping body 31 and the second clamping body 32 are connected by a fastener.

A corresponding surface of the first connecting seat 11 and the second connecting seat 12 is provided with a seat body, the seat body is provided with a chute 34, and the bracket is slidably matched with the chute 34.

The first oil cylinder 29 is disposed on the bracket. When the bracket is in the first position, the telescopic rod 20 of the first oil cylinder 29 corresponds to the pin shaft hole 13 of the first connecting seat 11. The second oil cylinder 30 is also disposed on the bracket and disposed side by side with the first oil cylinders 29. When the bracket is in the second position, the telescopic rod 20 of the second oil cylinder 30 corresponds to the pin shaft hole 13 of the second connecting seat 12. The arrangement directions of the first oil cylinder 29 and the second oil cylinder 30 are opposite since the first connecting seat 11 and the second connecting seat 12 are respectively disposed at two ends of the linear drive mechanism.

Since the first oil cylinder 29 and the second oil cylinder 30 are disposed side by side on the bracket, when the pin shaft 17 corresponding to the first oil cylinder 29 needs to be dismounted and mounted, the bracket can be controlled to slide, and the first oil cylinder 29 correspond to the pin shaft hole 13 of the first connecting seat 11. After the disassembly and assembly of the pin shaft 17 are completed through the first oil cylinder 29, the bracket is controlled to slide to the second position, the second oil cylinder 30 corresponds to the pin shaft hole 13 of the second connecting seat 12, and the pin shaft 17 on the second connecting seat 12 can be dismounted and mounted through the second oil cylinder 30. In the pin shaft dismounting and mounting device according to the present embodiment, the overall length formed by the first oil cylinder 29 and the second oil cylinder 30 is short, which can be adapted to the case where the distance between the first connecting seat 11 and the second connecting seat 12 is small.

Detail description will be made below by taking the linear drive mechanism consisting of the first oil cylinder 29, the second oil cylinder 30 and the bracket, the frame body 16 and the gantry 15 disposed on the frame body 16 as examples.

Dismounting process of the pin shaft 17 for connecting the gantry 15 to the frame body 16 is described as follows.

Figure 14:
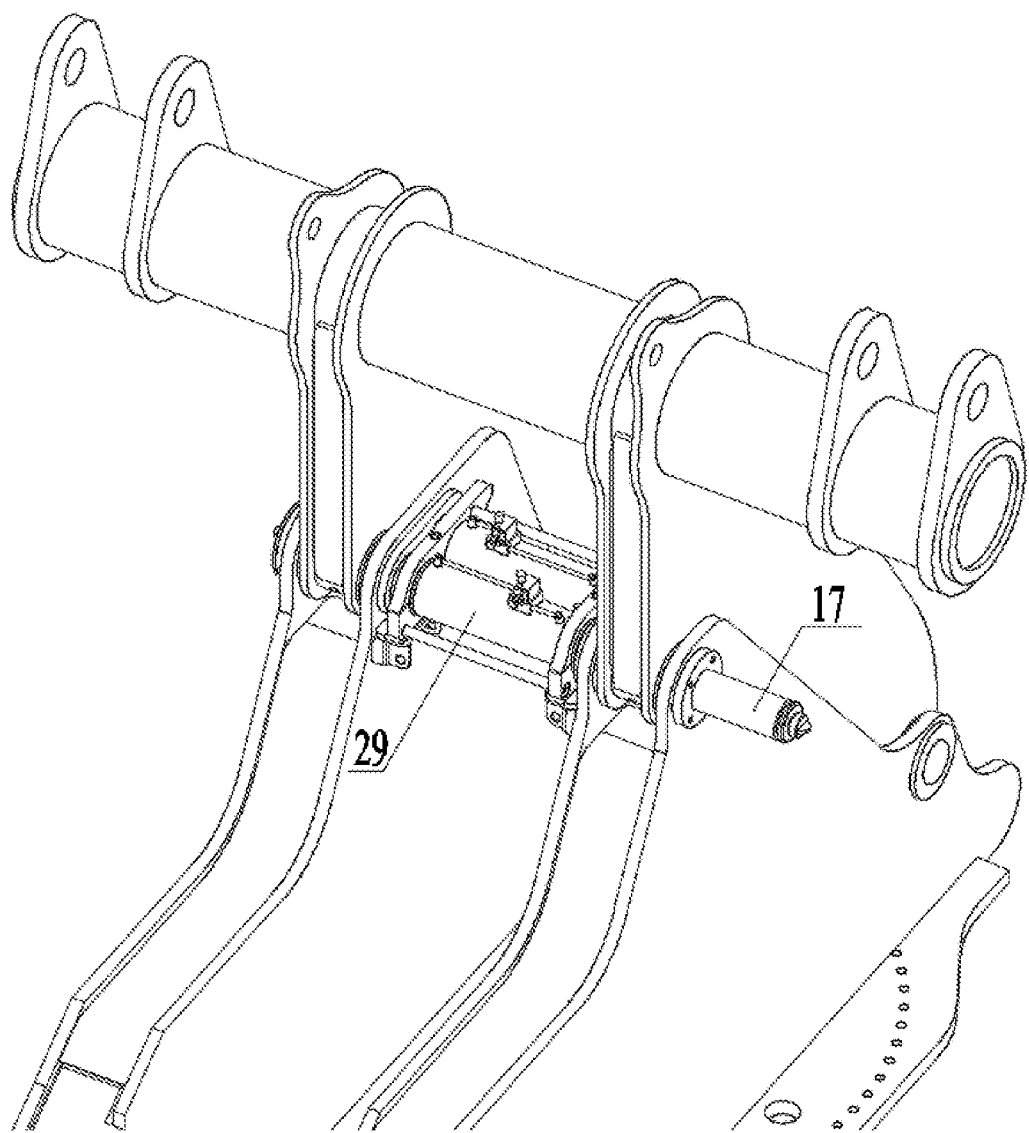
FIG. 14 is a schematic diagram of a first state in which a gantry is dismounted from a frame body by using a first oil cylinder and a second oil cylinders according to an embodiment of the present application.

In a first step, referring to FIG. 14, the connecting assembly 18 between the end portion of the pin shaft 17 and the connecting seat is removed, the bracket is controlled to slide along the chute 34, the telescopic rod 20 of the first oil cylinder 29 is aligned with the in shaft hole 13 on the first connecting seat 11, and the telescopic rod 20 of the first oil cylinder 29 is then operated to stretch to eject the pin shaft 17 on the first connecting seat 11 into the pin shaft hole 13 of an outer lug plate of the first connecting seat 11.

In a second step, the telescopic rod 20 of the first oil cylinder 29 is controlled to retract and exit out of the pin shaft hole 13 of the first connecting seat 11.

Figure 15:
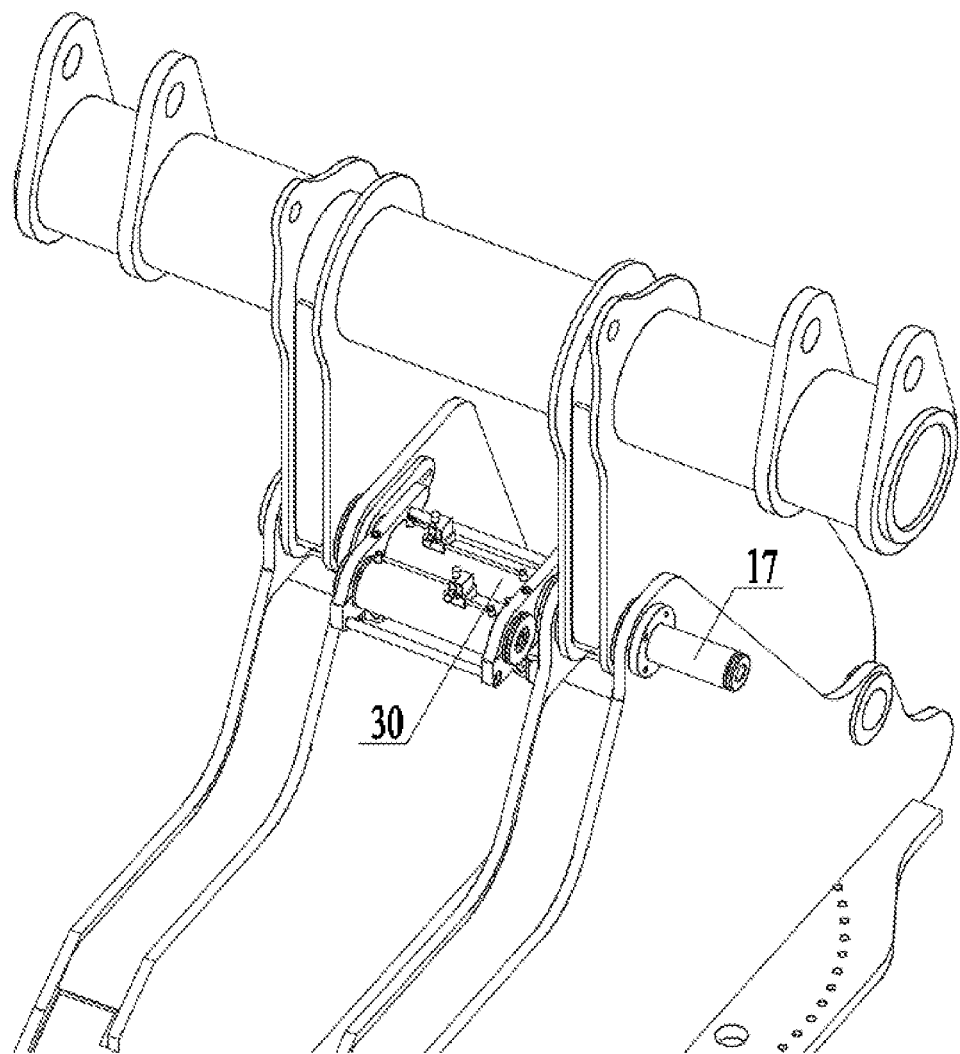
FIG. 15 is a schematic diagram of a second state in which a gantry is dismounted from a frame body by using a first oil cylinder and a second oil cylinders according to an embodiment of the present application.

In a third step, as shown in FIG. 15, the bracket is operated to slide along the chute 34 of the seat body, and the telescopic rod of the second oil cylinder 30 is aligned with the pin shaft hole 13 of the second connecting seat 12.

Figure 16:
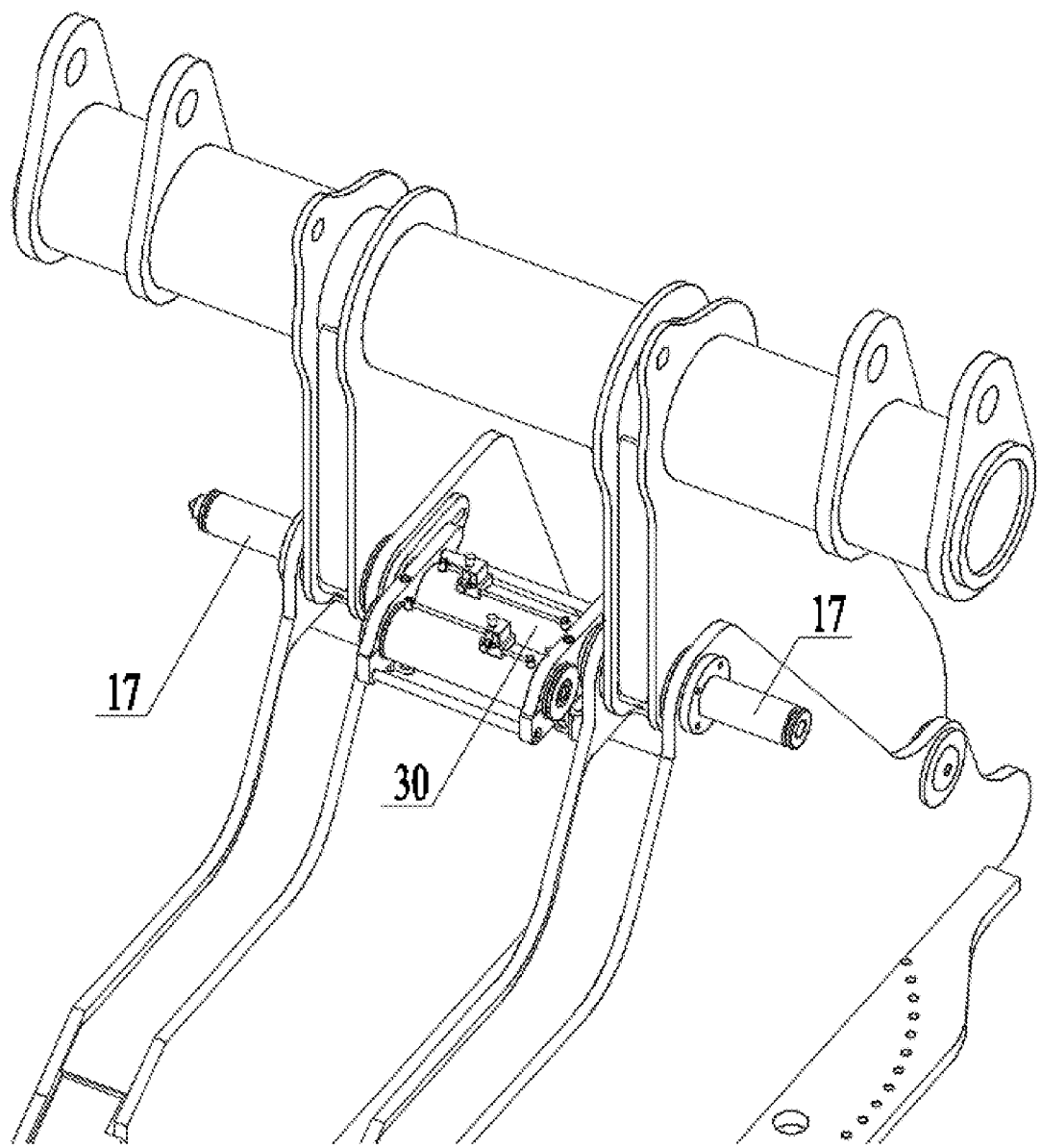
FIG. 16 is a schematic diagram of a third state in which a gantry is dismounted from a frame body by using a first oil cylinder and a second oil cylinders according to an embodiment of the present application.

In a fourth step, as shown in FIG. 16, the telescopic rod 20 of the second oil cylinder 30 is controlled to eject the pin shaft 17 on the second connecting seat 12 into the pin shaft hole 13 of an outer lug plate of the second connecting seat 12.

Figure 17:
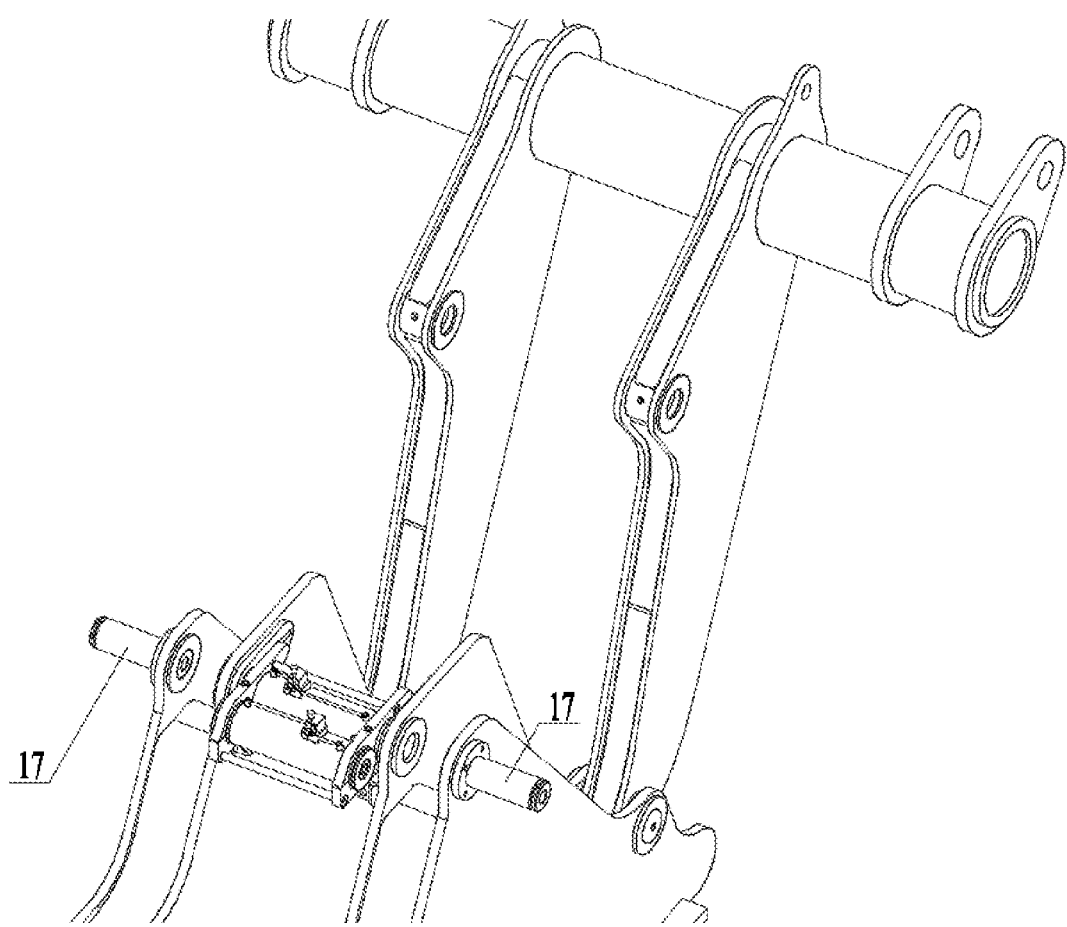
FIG. 17 is a schematic diagram of a fourth state in which a gantry is dismounted from a frame body by using a first oil cylinder and a second oil cylinders according to an embodiment of the present application.

In a fifth step, as shown in FIG. 17, the telescopic rod 20 of the second oil cylinder 30 is controlled to be retracted and thus the gantry 15 may be disengaged from the frame body 16.

Mounting process of the pin shaft 17 for connecting the gantry 15 to the frame body 16 is opposite of the above-mentioned dismounting process and is described in detail as follows.

In a first step, after the gantry 15 is aligned with the pin shaft hole 13 of the frame body 16, the telescopic rod 20 of the second oil cylinder 30 is controlled to stretch into the pin shaft hole 13 and comes into contact with the pin shaft 17.

In a second step, the pull rod 25 is inserted into the through hole 23 of the pin shaft 17 of the second connecting seat 12, and is connected with the telescopic rod 20 of the second oil cylinder 30.

In a third step, the telescopic rod 20 of the second oil cylinder 30 is controlled to be retracted, and the pin shaft 17 is pulled into the pin shaft hole 13 of the second connecting seat 12 through the pull rod 25 to mounting a pin shaft 17.

In a fourth step, the pull rod 25 in the pin shaft 17 of the second connecting seat 12 is removed, and the bracket is controlled to slide along the chute 34 of the seat body and thus the telescopic rod 20 of the first oil cylinder 29 is aligned with the pin shaft hole 13 of the first connecting seat 11.

In a fifth step, the telescopic rod 20 of the first oil cylinder 29 is controlled to stretch into the pin shaft hole 13 of the first connecting seat 11 and the telescopic rod 20 of the first oil cylinder 29 comes into contact with the pin shaft 17 on the first connecting seat 11.

In a sixth step, the pull rod 25 is inserted into the through hole 23 of the pin shaft 17 of the first connecting seat 11, and is connected to the telescopic rod 20 of the first oil cylinder 29.

In a seventh step, the telescopic rod 20 of the first oil cylinder 29 is controlled to be retracted, and the pin shaft 17 is pulled into the pin shaft hole 13 of the first connecting seat 11 through the pull rod 25 to mount another pin shaft 17.

In order to conveniently connect the pull rod 25 and the telescopic rod 20, in a further embodiment, a connecting structure between the pull rod 25 and the telescopic rod 20 includes an external thread 26 disposed at a second end of the pull rod 25 and a threaded hole 21 disposed on the end face of the telescopic rod 20 where the external thread 26 is fitted with threaded hole 21.

In this case, the connection between the pull rod 25 and the telescopic rod 20 can be realized by screwing the second end of the pull rod 25 into the threaded hole 21 of the telescopic rod 20.

In other embodiments, the connecting structure between the pull rod 25 and the telescopic rod 20 can also be configured as a snap connection or a keyway connection or the like.

In order to conveniently rotate the pull rod 25, a head-screwing structure 28 may be disposed on an end surface of the end cap structure 27 of the pull rod 25, and the head-screwing structure 28 may be an elongated protrusion for the operator to hold and rotate.

In a further embodiment, guide grooves 35 are disposed on the corresponding surfaces of the first connecting seat 11 and the second connecting seat 12, two ends of the guide groove 35 have closed structures, and guide posts 33 are disposed on two sides of the bracket and are slidably matched with the guide groove 35, that is, the guide post 33 can slide between a first end and a second end of the guide groove 35. When the bracket is in the first position, the guide post 33 abuts against the first end of the guide groove 35; when the bracket is in the second position, the guide post 33 abuts against the second end of the guide groove 35, and two ends of the guide groove 35 can have a limiting effect on the guide post 33.

When the bracket is controlled to slide along the chute 34, the guide post 33 on the bracket is displaced along the chute 34 at the same time. When the guide post 33 is displaced to the first end of the guide groove 35, the bracket can no longer move and is in the first position state, and the telescopic rod 20 of the first oil cylinder 29 corresponds to the pin shaft hole 13 of the first connecting seat 11. Similarly, when the guide post 33 is displaced to the second end of the guide groove 35, the bracket can no longer move and is in the second position, and the telescopic rod 20 of the second oil cylinder 30 corresponds to the pin shaft hole 13 of the second connecting seat 12. By this arrangement, the first oil cylinder 29 and the second oil cylinder 30 can be quickly aligned with the pin shaft hole 13.

After the pin shaft 17 is mounted in place, in a further embodiment, in order to improve the connection stability between the pin shaft 17 and the connecting seats, a connecting assembly is detachably disposed at the end portion of the pin shaft 17 and is used for being connected with sides of the connecting seats.

In an embodiment, the end portion of the pin shaft 17 is provided with an annular groove 24, and the connecting assembly 18 may be a non-enclosed connecting flange sleeved in the annular groove 24. The connecting flange can be sleeved within the annular groove 24 since the connecting flange is a non-enclosed structure. The connecting seat and the connecting flange are provided with corresponding bolt holes, the connecting flange can be fixedly connected to the connecting assembly 18 by bolts inserted inside the bolt holes and then the pin shaft 17 is fixedly connected.

An embodiment of the present application further provides a frame body connecting structure, which includes a first frame body and a second frame body. In some embodiments, the first frame body may be the frame body 16 in the above-mentioned embodiments, and the second frame body may be the gantry 15 in the above-mentioned embodiments. In other embodiments, the first frame body and the second frame body may also be other frame bodies used on the mechanical equipment.

Each of the first frame body and the second frame body is provided with a connecting seat, each connecting seat is provided with a pin shaft hole, the second frame body is connected with the first frame body through a pin shaft, and the pin shaft is provided with a through hole.

The pin shaft dismounting and mounting device is connected with the first frame body or the second frame body, the pin shaft dismounting and mounting device may be the pin shaft dismounting and mounting device in any of the above embodiments, and the telescopic rod corresponds to the pin shaft.

In some embodiments, the connecting seat includes a first connecting seat 11 and a second connecting seat 12 disposed at intervals, and a bracket is slidably disposed between the first connecting seat 11 and the second connecting seat 12, and may be switchable between a first position in which the telescopic rod of the first oil cylinder 29 corresponds to the pin shaft hole of the first connecting seat 11 and a second position in which the telescopic rod of the second oil cylinder 30 corresponds to the pin shaft hole of the second connecting seat 12.

An embodiment of the present application further provides work machine, including the above-mentioned frame body connecting structure.

By the frame body connecting structure and the work machine according to the present embodiment, the pin shaft 17 can be dismounted and mounted conveniently, and the problems of wear and deformation of the piston rod are solved.

Beneficial effects of the frame body connecting structure and the work machine is generally similar to those brought by the above-mentioned pin shaft dismounting and mounting device, and will not be repeated here.

Finally, the above embodiments are only used to illustrate the solutions of the present application, but not to limit thereto. Although the present application has been described in detail with reference to the foregoing embodiments, it should understand that solutions described in the foregoing embodiments may be modified or equivalently replaced with some features thereof while these modifications or replacements do not make the corresponding solutions deviate from the scope of the solutions in the embodiments of the present application.

What is claimed is:

1. A pin shaft dismounting and mounting device for dismounting and mounting a pin shaft on a connecting seat, the pin shaft is provided with a through hole along an axial direction of the pin shaft, comprising:
   a linear drive mechanism having two ends, comprising two or more telescopic rods, the telescopic rods being extendable from the two ends of the linear drive mechanism;
   a pull rod configured to pass through the through hole, a first end of the pull rod being provided with an end cap structure, a second end of the pull rod being connected with each of the two or more telescopic rods through a connecting structure after passing through the through hole, a length of a main body of the pull rod is greater than a length of the pin shaft and the second end of the pull rod stretches from an end where the through hole of the pin shaft is located and stretches out from another end of the pin shaft, a diameter of each telescopic rod is greater than a diameter of the through hole;
   each telescopic rod of the linear drive mechanism is configured to eject the pin shaft into a pin shaft hole or push the pin shaft out from the pin shaft hole;

wherein the linear drive mechanism comprises:
a bracket;
a first oil cylinder disposed on the bracket; and
a second oil cylinder disposed on the bracket and arranged side by side with the first oil cylinder, the telescopic rods of the second oil cylinder and the first oil cylinder are arranged in an opposite direction.

2. The device of claim 1, wherein the linear drive mechanism is a double-ended oil cylinder.

3. The device of claim 1, wherein the bracket comprises a first clamping body and a second clamping body, barrels of the first oil cylinder and the second oil cylinder are fixedly disposed between the first clamping body and the second clamping body, and the telescopic rods of the second oil cylinder and the first oil cylinder are capable of passing through the bracket and stretch from the barrels respectively.

4. The device of claim 1, further comprising a reversing valve configured to control the extending direction of each the telescopic rod.

5. The device of claim 1, wherein the connecting structure comprises:
an external thread disposed on the second end of the pull rod; and
a threaded hole disposed on an end surface of each telescopic rod, the external thread is fitted with the threaded hole.

6. A frame body connecting structure, comprising:
a first frame body,
a second frame body, both the first frame body and the second frame body are provided with connecting seats, each connecting seat is provided with a pin shaft hole, and the second frame body is connected to the first frame body through a pin shaft, the pin shaft is provided with a through hole, and
a pin shaft dismounting and mounting device, connected to the first frame body or the second frame body, the pin shaft dismounting and mounting device being the pin shaft dismounting and mounting device of a claim 1, the telescopic rod corresponds to the pin shaft.

7. The frame body connecting structure of claim 6, wherein the bracket is arranged slidably between the first connecting seat and the second connecting seat, and the bracket is switchable between a first position in which a telescopic rod of the first oil cylinder corresponds to the pin shaft hole of the first connecting seat and a second position in which a telescopic rod of the second oil cylinder corresponds to the pin shaft hole of the second connecting seat.

8. A work machine, comprising the frame body connecting structure of claim 6.

9. A work machine, comprising the frame body connecting structure of claim 7.

* * * * *